US009679510B2

(12) United States Patent
Li et al.

(10) Patent No.: US 9,679,510 B2
(45) Date of Patent: Jun. 13, 2017

(54) DISPLAY APPARATUS AND PIXEL VOLTAGE DRIVING METHOD THEREOF

(71) Applicant: AU Optronics Corp., Hsin-Chu (TW)

(72) Inventors: Huan-Hsin Li, Hsinchu County (TW); Yu-Jen Chen, Hsin-Chu (TW); De-Zhang Peng, Hsin-Chu (TW); Chi-Fu Tsao, Hsin-Chu (TW)

(73) Assignee: AU OPTRONICS CORP., Hsin-Chu (TW)

( * ) Notice: Subject to any disclaimer, the term of this patent is extended or adjusted under 35 U.S.C. 154(b) by 99 days.

(21) Appl. No.: 14/817,220

(22) Filed: Aug. 4, 2015

(65) Prior Publication Data

US 2015/0364074 A1 Dec. 17, 2015

Related U.S. Application Data

(63) Continuation of application No. 13/462,779, filed on May 2, 2012, now abandoned.

(30) Foreign Application Priority Data

Aug. 30, 2011 (TW) ............................ 100131067 A

(51) Int. Cl.

| | |
|---|---|
| ***G06F 3/038*** | (2013.01) |
| ***G09G 5/00*** | (2006.01) |
| ***G09G 3/20*** | (2006.01) |
| ***G09G 3/36*** | (2006.01) |

(52) U.S. Cl.

CPC ............ *G09G 3/2018* (2013.01); *G09G 3/20* (2013.01); *G09G 3/3685* (2013.01); *G09G 2310/0248* (2013.01); *G09G 2310/0275* (2013.01); *G09G 2330/021* (2013.01)

(58) Field of Classification Search

CPC ...... G09G 3/2018; G09G 3/20; G09G 3/3685; G09G 2310/0248; G09G 2310/0275; G09G 2330/021

USPC .......................................................... 345/212

See application file for complete search history.

(56) References Cited

U.S. PATENT DOCUMENTS

| | | | |
|---|---|---|---|
| 7,403,185 | B2 | 7/2008 | Song |
| 2005/0104815 | A1 | 5/2005 | Komiya |
| 2006/0001630 | A1 | 1/2006 | Chen |
| 2006/0262069 | A1 | 11/2006 | Do |
| 2008/0303809 | A1 | 12/2008 | Lee |

(Continued)

*Primary Examiner* — Mark Regn

(74) *Attorney, Agent, or Firm* — Locke Lord LLP; Tim Tingkang Xia, Esq.

(57) ABSTRACT

A display apparatus includes a pixel array, a data line and a data driver. The pixel array has adjacent first and second pixels disposed in different rows. The data line transmits first and second pixel voltages to be written into the first and second pixels respectively. The first and second pixel voltages are employed to illustrate a same frame. The data driver is utilized for generating the first and second pixel voltages furnished to the data line based on input image data. The data driver includes a voltage analysis unit and a voltage setting unit. The voltage analysis unit is used for calculating a voltage difference between the first and second pixel voltages, and for comparing the voltage difference with a preset value so as to generate a control signal. The voltage setting unit is utilized for setting the voltage of the data line according to the control signal.

4 Claims, 9 Drawing Sheets

(56) References Cited

U.S. PATENT DOCUMENTS

2008/0309594 A1* 12/2008 Mas .................... G09G 3/3208
345/76

* cited by examiner

| Adaptation-mode data line voltage driving mechanism | | | | | |
|---|---|---|---|---|---|
| nth row pixel voltage | VPn_m-2<br>-15V | VPn_m-1<br>-15V | VPn_m<br>+15V | VPn_m+1<br>+15V | VPn_m+2<br>+15V |
| (n+1)th row pixel voltage | VPn+1_m-2<br>-15V | VPn+1_m-1<br>-15V | VPn+1_m<br>-15V | VPn+1_m+1<br>-15V | VPn+1_m+2<br>+15V |
| Data line voltage setting value between pulses of SGn and SGn+1 | SDm-2<br>-15V | SDm-1<br>-15V | SDm<br>0V | SDm+1<br>0V | SDm+2<br>+15V |
| Data line voltage change amount upon inputting pulse of SGn+1 | △SDm-2<br>0V | △SDm-1<br>0V | △ SDm<br>15V | △SDm+1<br>15V | △SDm+2<br>0V |
| Total data line voltage change amount | 30V | | | | |

FIG. 3

| Tradition-mode data line voltage driving mechanism | | | | | |
|---|---|---|---|---|---|
| nth row pixel voltage | VPn_m-2<br>-15V | VPn_m-1<br>-15V | VPn_m<br>+15V | VPn_m+1<br>+15V | VPn_m+2<br>+15V |
| (n+1)th row pixel voltage | VPn+1_m-2<br>-15V | VPn+1_m-1<br>-15V | VPn+1_m<br>-15V | VPn+1_m+1<br>-15V | VPn+1_m+2<br>+15V |
| Data line voltage setting value between pulses of SGn and SGn+1 | SDm-2<br>-15V | SDm-1<br>-15V | SDm<br>+15V | SDm+1<br>+15V | SDm+2<br>+15V |
| Data line voltage change amount upon inputting pulse of SGn+1 | △SDm-2<br>0V | △SDm-1<br>0V | △ SDm<br>30V | △SDm+1<br>30V | △SDm+2<br>0V |
| Total data line voltage change amount | 60V | | | | |

FIG. 4

| Power-division-mode data line voltage driving mechanism | | | | | |
|---|---|---|---|---|---|
| nth row pixel voltage | VPn_m-2<br>-15V | VPn_m-1<br>-15V | VPn_m<br>+15V | VPn_m+1<br>+15V | VPn_m+2<br>+15V |
| (n+1)th row pixel voltage | VPn+1_m-2<br>-15V | VPn+1_m-1<br>-15V | VPn+1_m<br>-15V | VPn+1_m+1<br>-15V | VPn+1_m+2<br>+15V |
| Data line voltage setting value between pulses of SGn and SGn+1 | SDm-2<br>0V | SDm-1<br>0V | SDm<br>0V | SDm+1<br>0V | SDm+2<br>0V |
| Data line voltage change amount upon inputting pulse SGn+1 | △SDm-2<br>15V | △SDm-1<br>15V | △ SDm<br>15V | △SDm+1<br>15V | △SDm+2<br>15V |
| Total data line voltage change amount | 75V | | | | |

FIG. 5

DISPLAY APPARATUS AND PIXEL VOLTAGE DRIVING METHOD THEREOF

CROSS REFERENCE TO RELATED APPLICATIONS

This application is a continuation of U.S. patent application Ser. No. 13/462,779, filed May 2, 2012.

BACKGROUND OF THE INVENTION

1. Field of the Invention

The disclosure relates to a display apparatus and driving method thereof, and more particularly, to a display apparatus having adaptation-mode data line voltage driving mechanism and pixel voltage driving method thereof.

2. Description of the Prior Art

Flat panel displays (FPDs) have advantages of a thin profile, low power consumption, and low radiation, and are broadly adopted for application in a variety of electronic appliances such as media players, mobile phones, personal digital assistants (PDAs), and computer monitors, etc. In general, the structure of a flat panel display includes a pixel array, a data driver, a scan driver, a plurality of data lines, and a plurality of scan lines. The data driver is utilized for providing plural data signals furnished to the pixel array via the data lines. The scan driver is utilized for providing plural scan signals furnished to the pixel array via the scan lines. The pixel array is employed to illustrate images through performing pixel voltage writing operations based on the data signals and the scan signals. However, as dimensions of the flat panel display increase, both trace resistance and parasitic capacitor of each data line increase, such that the switching of voltage at each data line incurs higher charge/discharge driving power consumption. For that reason, how to reduce charge/discharge driving power consumption in the process of voltage switching at each data line has become one of the most important topics nowadays.

SUMMARY OF THE INVENTION

In accordance with an embodiment of the present invention, a pixel voltage driving method for reducing the data line driving power consumption of a display apparatus is provided. The display apparatus includes adjacent first and second pixels disposed in different rows. The pixel voltage driving method comprises: providing a first pixel voltage and a second pixel voltage to be written into the first and second pixels respectively; calculating a voltage difference between the first and second pixel voltages and comparing the voltage difference with a preset value for generating a comparison result; and performing a pixel voltage driving operation for writing the second pixel voltage into the second pixel according to the comparison result. It is noted that the first and second pixel voltages are employed to illustrate one and the same frame.

The present invention further provides a display apparatus having adaptation-mode data line voltage driving mechanism for reducing the data line driving power consumption. The display apparatus comprises a pixel array, a data line, and a data driver. The pixel array has adjacent first and second pixels disposed in different rows. The data line, electrically connected to the first and second pixels, is utilized for transmitting a first pixel voltage and a second pixel voltage to be written into the first and second pixels respectively. The first and second pixel voltages are employed to illustrate one and the same frame. The data driver, electrically connected to the data line, is employed to generate the first and second pixel voltages based on input image data. The data driver comprises a voltage analysis unit and a voltage setting unit. The voltage analysis unit is put in use for calculating a voltage difference between the first and second pixel voltages, and for comparing the voltage difference with a preset value so as to generate a control signal. The voltage setting unit, electrically connected to the voltage analysis unit and the data line, is utilized for setting a voltage at the data line according to the control signal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a chart showing an analysis of pixel voltages/data line voltages regarding the operation of the display apparatus 100 having adaptation-mode data line voltage driving mechanism illustrated in FIG. 1 based on the first pixel voltage driving method.

FIG. 4 is a chart showing an analysis of pixel voltages/data line voltages regarding the operation of a display apparatus having tradition-mode data line voltage driving mechanism.

FIG. 5 is a chart showing an analysis of pixel voltages/data line voltages regarding the operation of a display apparatus having power-division-mode data line voltage driving mechanism.

DETAILED DESCRIPTION

Hereinafter, some embodiments of the present invention will be described in detail with reference to the accompanying drawings. Here, it is to be noted that the present invention is not limited thereto. Furthermore, the step serial numbers regarding the pixel voltage driving method are not meant thereto limit the operating sequence, and any rearrangement of the operating sequence for achieving same functionality is still within the spirit and scope of the invention.

Figure 1:
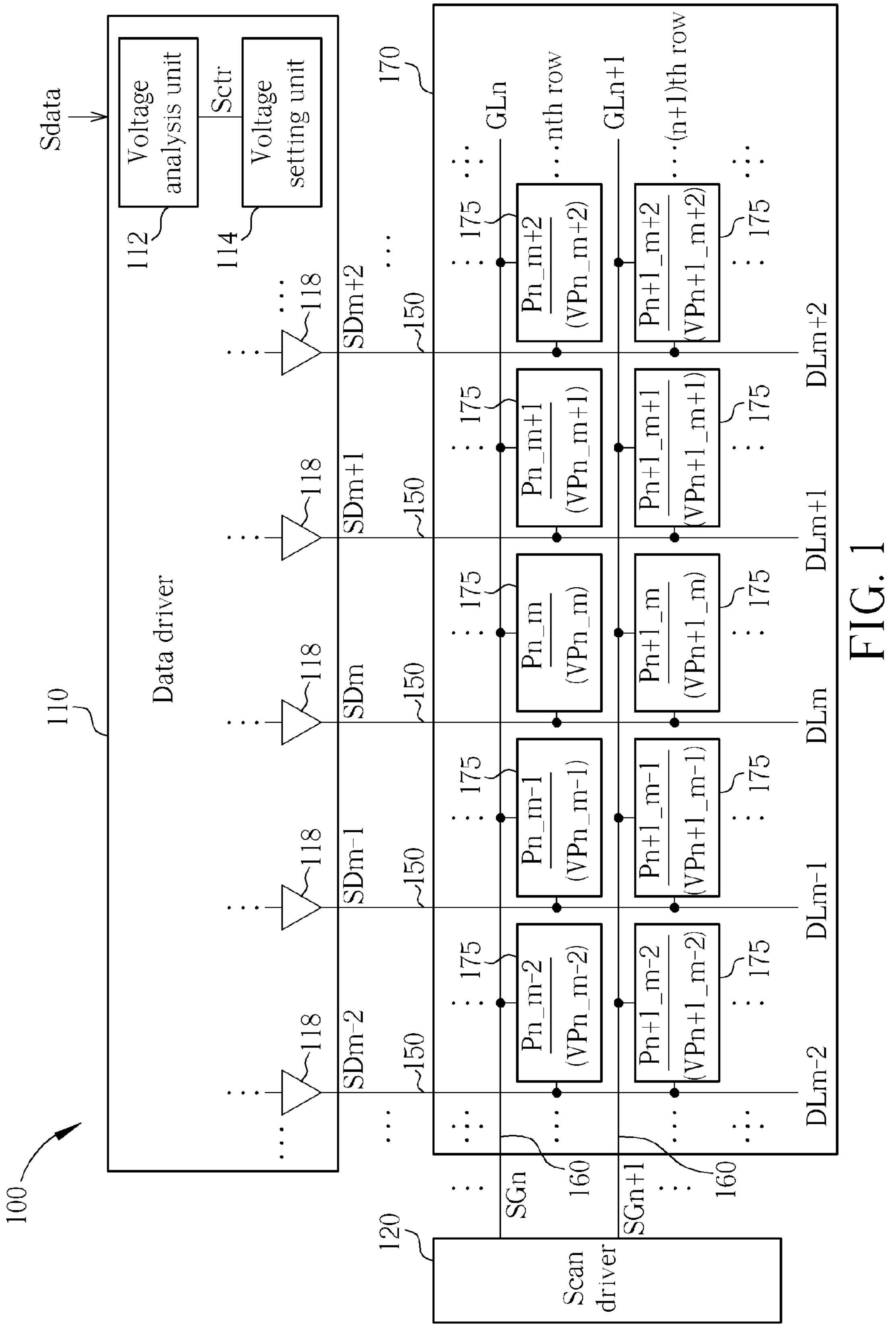
FIG. 1 is a schematic diagram showing the structure of a display apparatus having adaptation-mode data line voltage driving mechanism in accordance with a preferred embodiment.

FIG. 1 is a schematic diagram showing the structure of a display apparatus having adaptation-mode data line voltage driving mechanism in accordance with a preferred embodiment. As shown in FIG. 1, the display apparatus 100 comprises a data driver 110, a scan driver 120, a plurality of data lines 150 electrically connected to the data driver 110, a plurality of scan lines 160 electrically connected to the scan driver 120, and a pixel array 170. The data driver 110 is utilized for converting input image data Sdata into plural data signals furnished to the data lines 150 respectively. The scan driver 120 is utilized for providing plural scan signals furnished to the scan lines 160 respectively. The pixel array 170 comprises a plurality of pixels 175 arranged in a matrix form. Each pixel 175, electrically connected to one corresponding data line 150 and one corresponding scan line 160, is employed to illustrate image through performing a pixel voltage writing operation based on one corresponding data signal and one corresponding scan signal. For instance, concerning a pixel Pn_m electrically connected to data line DLm and gate line GLn, when the scan signal SGn enables the writing operation of the pixel Pn_m, the data signal SDm having pixel voltage VPn_m is written into the pixel Pn_m for illustrating image. Alternatively, concerning a pixel Pn+1_m electrically connected to data line DLm and gate line GLn+1, when the scan signal SGn+1 enables the writing operation of the pixel Pn+1_m, the data signal SDm having pixel voltage VPn+1_m is written into the pixel Pn+1_m for illustrating image.

The data driver 110 comprises a voltage analysis unit 112, a voltage setting unit 114, and a plurality of buffers 118. In another embodiment, the voltage analysis unit 112 is disposed in a timing controller (not shown) of the display apparatus 100. The voltage analysis unit 112 is employed to calculate a voltage difference Vdiff between the pixel voltages of two adjacent pixels disposed in different rows, and is further employed to compare the voltage difference Vdiff with a preset value Vpd for generating a control signal Sctr. For example, a difference calculation may be performed based on the pixel voltage VPn_m and the pixel voltage VPn+1_m for obtaining the voltage difference Vdiff which in turn is compared with the preset value Vpd for generating the control signal Sctr. The preset value Vpd may be a voltage difference between the highest and lowest pixel voltages. Alternatively, the preset value Vpd may be a positive voltage less than the voltage difference between the highest and lowest pixel voltages, e.g. the preset value Vpd may be half the voltage difference between the highest and lowest pixel voltages. The voltage setting unit 114, electrically connected to the voltage analysis unit 112 and the data lines 150, is utilized for setting each data line voltage according to the control signal Sctr, e.g. setting the voltage at the data line DLm based on the control signal Sctr generated through performing a comparison operation over the voltage difference Vdiff between the pixel voltage VPn_m and the pixel voltage VPn+1_m.

Figure 2A:
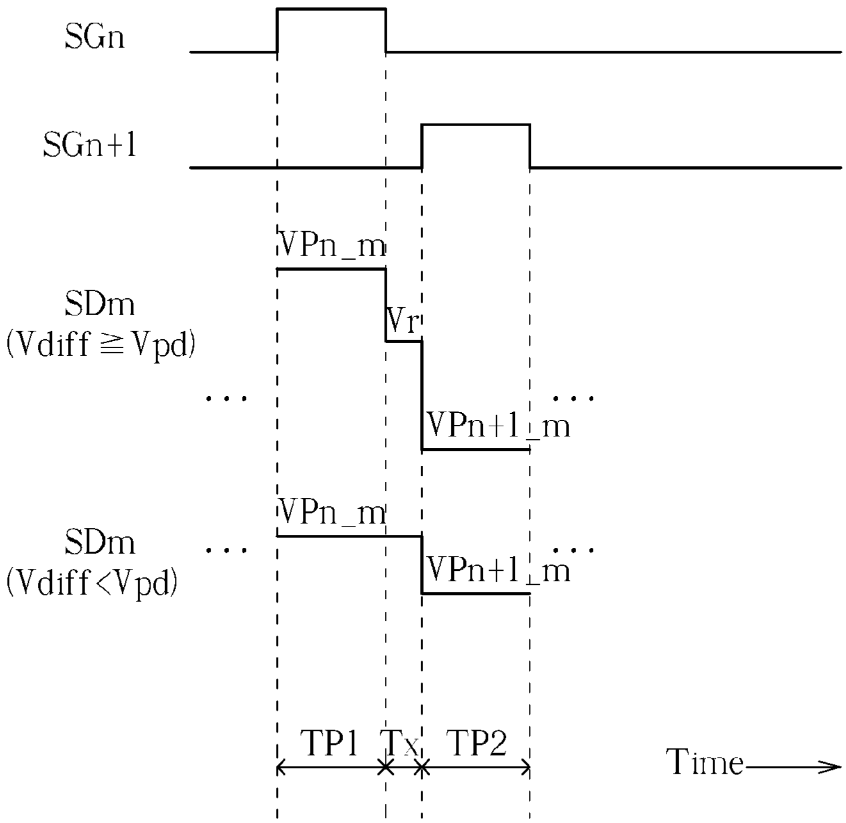
FIG. 2A is a schematic diagram showing related signal waveforms regarding the operation of the display apparatus 100 illustrated in FIG. 1 based on a first pixel voltage driving method, having time along the abscissa.
Figure 2B:
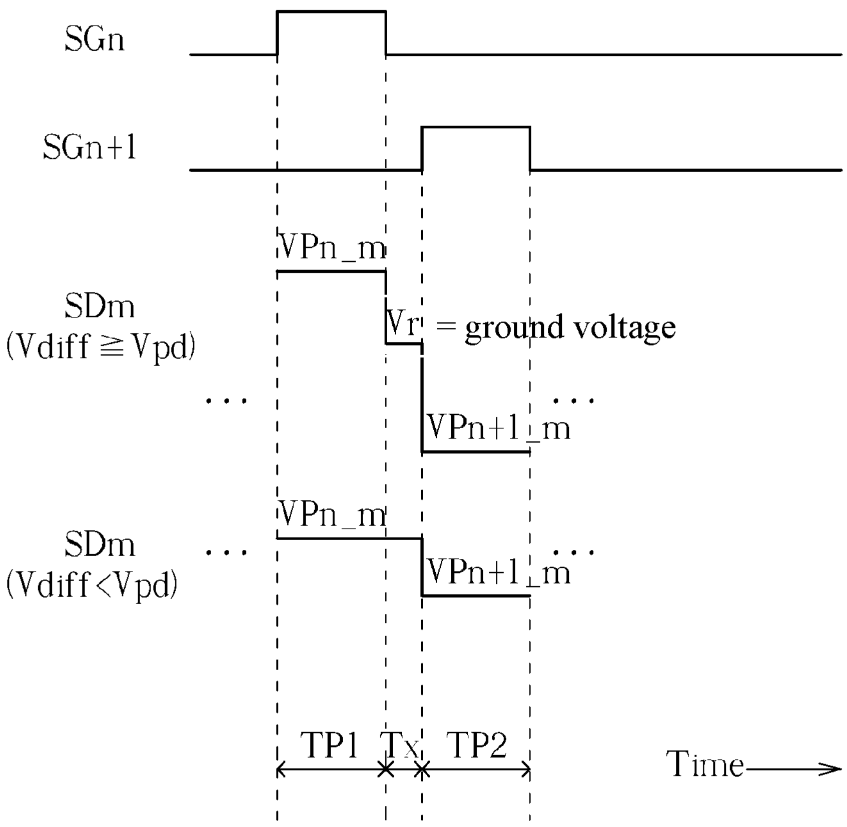
FIG. 2B is a schematic diagram showing the related signal waveforms illustrated in FIG. 2B, where the reference voltage is a ground voltage.

FIG. 2A is a schematic diagram showing related signal waveforms regarding the operation of the display apparatus 100 illustrated in FIG. 1 based on a first pixel voltage driving method, having time along the abscissa FIG. 2B is a schematic diagram showing the related signal waveforms illustrated in FIG. 2B, where the reference voltage is a ground voltage. The signal waveforms in FIG. 2A, from top to bottom, are the gate signal SGn, the gate signal SGn+1, the data signal SDm corresponding to a comparison result Vdiff≥Vpd, and the data signal SDm corresponding to a comparison result Vdiff<Vpd. It is noted that, in another embodiment, the comparison results Vdiff≥Vpd and Vdiff<Vpd may be replaced with Vdiff>Vpd and Vdiff≤Vpd respectively. Referring to FIG. 2A in conjunction with FIG. 1, during an interval TP1, the scan driver 120 provides the scan signal SGn having high voltage level for enabling the writing operation of the pixel Pn_m. At this time, the data driver 110 furnishes the data signal SDm having the pixel voltage VPn_m to the data line DLm, and the pixel voltage VPn_m is then written into the pixel Pn_m. It is noted that the voltage analysis unit 112 may perform the difference and comparison operations related to the pixel voltages VPn_m and VPn+1_m before or after writing the pixel voltage VPn_m into the pixel Pn_m. During an interval TP2, the scan driver 120 provides the scan signal SGn+1 having high voltage level for enabling the writing operation of the pixel Pn+1_m. At this time, the data driver 110 furnishes the data signal SDm having the pixel voltage VPn+1_m to the data line DLm, and the pixel voltage VPn+1_m is then written into the pixel Pn+1_m.

During an interval Tx between the interval TP1 and the interval TP2, i.e. after writing the pixel voltage VPn_m into the pixel Pn_m and before furnishing the data signal SDm having the pixel voltage VPn+1_m to the data line DLm, if the voltage difference Vdiff is not less than the preset value Vpd, the voltage setting unit 114 sets the voltage at the data line DLm to be a reference voltage Vr according to the control signal Sctr, e.g. connecting the data line DLm to a power line having the reference voltage Vr according to the control signal Sctr. The reference voltage Vr may be a ground voltage, as shown in FIG. 2B, or an intermediate voltage between the highest and lowest pixel voltages, as shown in FIG. 2A. That is, in the process of switching the data signal SDm from the pixel voltage VPn_m to the pixel voltage VPn+1_m, the buffer 118 electrically connected to the data line DLm is required to convert the voltage at the data line DLm simply from the reference voltage Vr to the pixel voltage VPn+1_m, thereby significantly reducing the driving power consumption of the buffer 118. It is noted that the voltage setting unit 114 is required to disconnect the data line DLm from the aforementioned power line having the reference voltage Vr during the interval TP2, such that the buffer 118 connected to the data line DLm is allowed to output the pixel voltage VPn+1_m.

Alternatively, if the voltage difference Vdiff is less than the preset value Vpd, the voltage at the data line DLm is retained to be around the pixel voltage VPn_m during the interval Tx, for saving additional charge/discharge driving power consumption caused by unnecessary voltage switching of the data line DLm. In particular, when the pixel voltage VPn+1_m is equal to the pixel voltage VPn_m, if the voltage at the data line DLm is first switched from the pixel voltage VPn_m to the reference voltage Vr and then switched to the pixel voltage VPn+1_m, an unnecessary voltage switching operation over the data line DLm is performed, thereby resulting in additional charge/discharge driving power consumption. On the contrary, if the voltage at the data line DLm is retained to be around the pixel voltage VPn_m identical to the pixel voltage VPn+1_m during the interval Tx, the charge/discharge driving power consumption dissipated in the operation of the display apparatus 100 from the interval TP1 to the interval TP2 is almost null.

FIG. 3 is a chart showing an analysis of pixel voltages/data line voltages regarding the operation of the display apparatus 100 having adaptation-mode data line voltage driving mechanism illustrated in FIG. 1 based on the first pixel voltage driving method. FIG. 4 is a chart showing an analysis of pixel voltages/data line voltages regarding the operation of a display apparatus having tradition-mode data line voltage driving mechanism. FIG. 5 is a chart showing an analysis of pixel voltages/data line voltages regarding the operation of a display apparatus having power-division-mode data line voltage driving mechanism. It is noted that, while performing the first pixel voltage driving method corresponding to the adaptation-mode data line voltage driving mechanism in FIG. 3, the preset value Vpd may be 30V or a positive voltage less than 30V, and the reference voltage Vr is 0V. Besides, the display device having tradition-mode or power-division-mode data line voltage driving mechanism includes the data lines 150, the scan lines 160 and the pixel array 170 shown in FIG. 1.

As shown in FIG. 3, in the operation of the display apparatus 100 having adaptation-mode data line voltage driving mechanism based on the first pixel voltage driving method, since the voltage difference Vdiff between the pixel voltage VPn_m−2 and the pixel voltage VPn+1_m−2 is less than the preset value Vpd, the data signal SDm−2 of the data line DLm−2 during the interval Tx between pulses of SGn and SGn+1 is retained to be around the pixel voltage VPn_m−2 (−15V). Likewise, since the voltage difference Vdiff between the pixel voltage VPn_m−1 and the pixel voltage VPn+1_m−1 is less than the preset value Vpd, the data signal SDm−1 of the data line DLm−1 during the interval Tx is retained to be around the pixel voltage VPn_m−1 (−15V). Further, since the voltage difference Vdiff between the pixel voltage VPn_m+2 and the pixel voltage VPn+1_m+2 is less than the preset value Vpd, the data signal SDm+2 of the data line DLm+2 during the interval Tx is retained to be around the pixel voltage VPn_m+2 (+15V). Besides, since the voltage difference Vdiff between the pixel voltage VPn_m and the pixel voltage VPn+1_m is not less than the preset value Vpd, the data signal SDm of the data line DLm during the interval Tx is set to be the reference voltage Vr (0V). Finally, since the voltage difference Vdiff between the pixel voltage VPn_m+1 and the pixel voltage VPn+1_m+1 is not less than the preset value Vpd, the data signal SDm+1 of the data line DLm+1 during the interval Tx is set to be the reference voltage Vr (0V). Accordingly, in the process from the interval Tx to the interval TP2 as shown in FIG. 2A, the voltage changing amounts ΔSD of the data lines DLm−2, DLm−1 and DLm+2 are all substantially null, and the voltage changing amounts ΔSD of the data lines DLm and DLm+1 are both around 15V. As a result, in the aforementioned operation of the display apparatus 100 having adaptation-mode data line voltage driving mechanism based on the first pixel voltage driving method, the voltage changing amounts ΔSDm−2~ΔSDm+2 of the data lines DLm−2~DLm+2 driven by the buffers 118 connected thereto are totaled to 30V.

As shown in FIG. 4, in the operation of the display apparatus having tradition-mode data line voltage driving mechanism based on a corresponding pixel voltage driving method thereof, the voltages of the data lines DLm−2~DLm+2 during the interval Tx between pulses of SGn and SGn+1 are retained to be around the pixel voltages VPn_m−2~VPn_m+2 respectively, such that the voltage changing amounts ΔSDm−2~ΔSDm+2 of the data lines DLm−2~DLm+2 are totaled to 60V. As shown in FIG. 5, in the operation of the display apparatus having power-division-mode data line voltage driving mechanism based on a corresponding pixel voltage driving method thereof, the voltages of the data lines DLm−2~DLm+2 during the interval Tx between pulses of SGn and SGn+1 are all set to be the reference voltage Vr (0V), such that the voltage changing amounts ΔSDm−2~ΔSDm+2 of the data lines DLm−2~DLm+2 are totaled to 75V. With the above in mind, it is obvious that, compared with the operation of the prior-art display apparatus having tradition-mode or power-division-mode data line voltage driving mechanism, the operation of the display apparatus 100 having adaptation-mode data line voltage driving mechanism obtains much better performance in reducing the total driving power consumption of the buffers 118 through significantly lowering the total voltage changing amount of data lines driven by the buffers 118.

Figure 6:
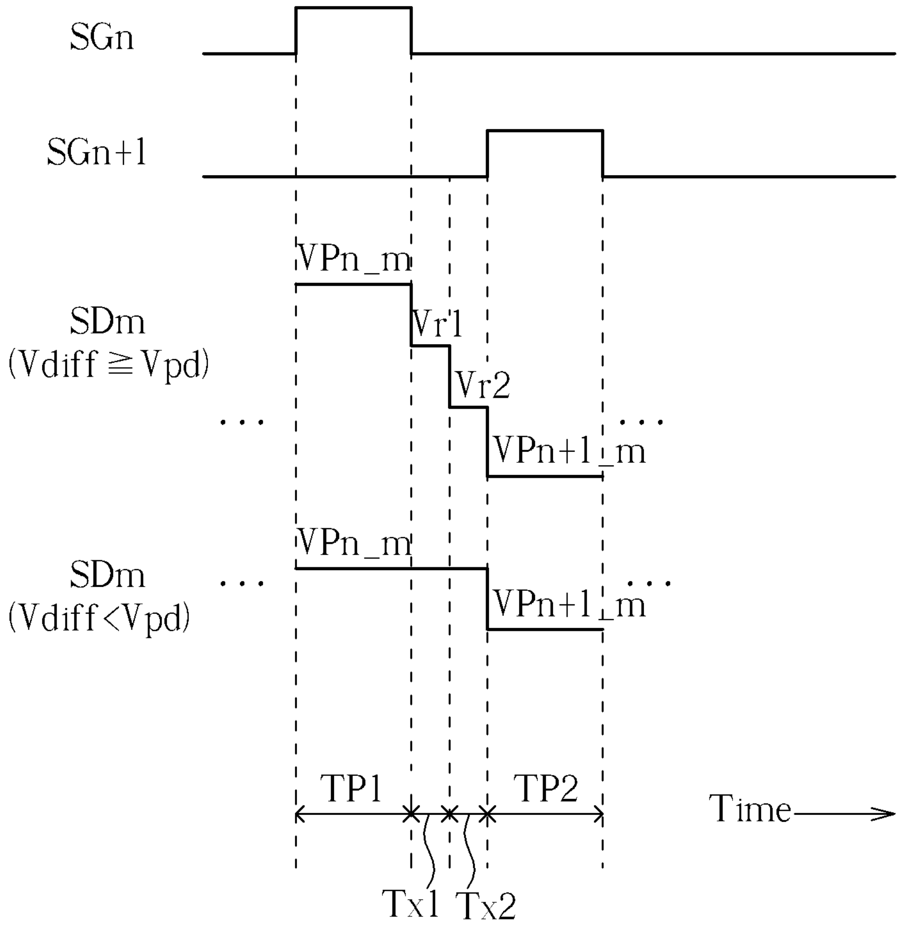
FIG. 6 is a schematic diagram showing related signal waveforms regarding the operation of the display apparatus 100 illustrated in FIG. 1 based on a second pixel voltage driving method, having time along the abscissa.

FIG. 6 is a schematic diagram showing related signal waveforms regarding the operation of the display apparatus 100 illustrated in FIG. 1 based on a second pixel voltage driving method, having time along the abscissa. The signal waveforms in FIG. 6, from top to bottom, are the gate signal SGn, the gate signal SGn+1, the data signal SDm corresponding to a comparison result Vdiff≥Vpd, and the data signal SDm corresponding to a comparison result Vdiff<Vpd. Similarly, in another embodiment, the comparison results Vdiff≥Vpd and Vdiff<Vpd may be replaced with Vdiff>Vpd and Vdiff≤Vpd respectively. Referring to FIG. 6 in conjunction with FIG. 1, during an interval TP1, the scan driver 120 provides the scan signal SGn having high voltage level for enabling the writing operation of the pixel Pn_m. At this time, the data driver 110 furnishes the data signal SDm having the pixel voltage VPn_m to the data line DLm, and the pixel voltage VPn_m is then written into the pixel Pn_m. During an interval TP2, the scan driver 120 provides the scan signal SGn+1 having high voltage level for enabling the writing operation of the pixel Pn+1_m. At this time, the data driver 110 furnishes the data signal SDm having the pixel voltage VPn+1_m to the data line DLm, and the pixel voltage VPn+1_m is then written into the pixel Pn+1_m.

During a first interval Tx1 after the interval TP1, if the voltage difference Vdiff is not less than the preset value Vpd, the voltage setting unit 114 sets the voltage at the data line DLm to be a first reference voltage Vr1 according to the control signal Sctr. Further, during a second interval Tx2 between the first interval Tx1 and the interval TP2, the voltage setting unit 114 sets the voltage at the data line DLm to be a second reference voltage Vr2 different from the first reference voltage Vr1 according to the control signal Sctr. The first reference voltage Vr1 and the second reference voltage Vr2 are two intermediate voltages between the highest and lowest pixel voltages. That is, in the process of switching the data signal SDm from the pixel voltage VPn_m to the pixel voltage VPn+1_m, the buffer 118 electrically connected to the data line DLm is required to convert the voltage at the data line DLm simply from the second reference voltage Vr2 to the pixel voltage VPn+1_m, thereby significantly reducing the driving power consumption of the buffer 118. Alternatively, if the voltage difference Vdiff is less than the preset value Vpd, the voltage at the data line DLm is retained to be around the pixel voltage VPn_m during the first interval Tx1 and the second interval Tx2, for saving additional charge/discharge driving power consumption caused by unnecessary voltage switching of the data line DLm. It is noted that, in the operation of the display apparatus 100 based on the second pixel voltage driving method, the intermediate period between the interval TP1 and the interval TP2 may be divided into more intervals so as to provide a multi-stage voltage changing process of switching the data signal SDm from the pixel voltage VPn_m to the pixel voltage VPn+1_m with the aid of more reference voltages.

Figure 7:
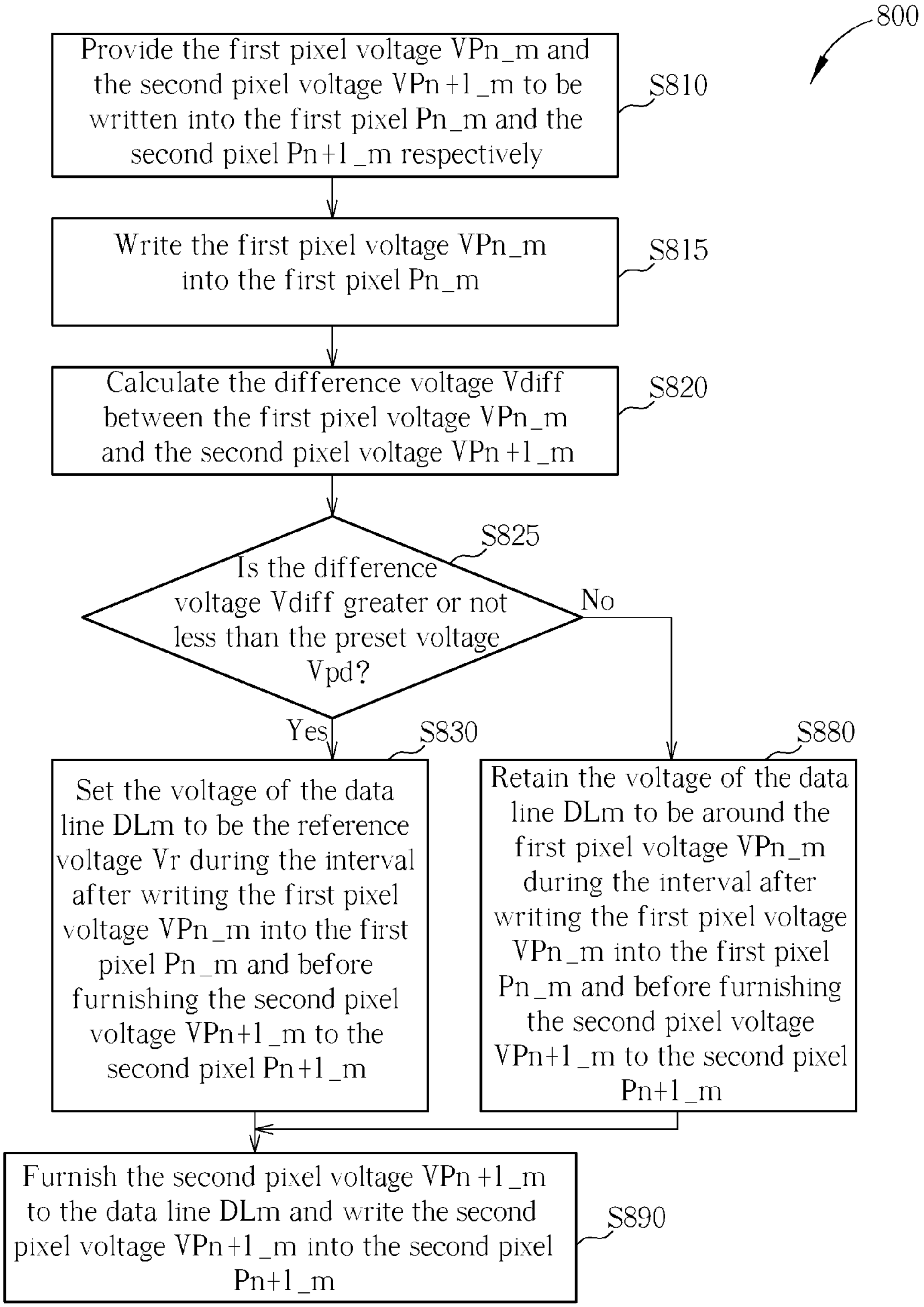
FIG. 7 is a flowchart depicting the first pixel voltage driving method for use in the display apparatus 100 illustrated in FIG. 1.

FIG. 7 is a flowchart depicting the first pixel voltage driving method for use in the display apparatus 100 illustrated in FIG. 1. As shown in FIG. 7, the flow 800 of the first pixel voltage driving method comprises the following steps:

Step S810: providing the first pixel voltage VPn_m and the second pixel voltage VPn+1_m to be written into the first pixel Pn_m and the second pixel Pn+lm respectively, wherein the first pixel voltage VPn_m and the second pixel voltage VPn+1_m are employed to illustrate one and the same frame;

Step S815: writing the first pixel voltage VPn_m into the first pixel Pn_m;

Step S820: calculating the voltage difference Vdiff between the first pixel voltage VPn_m and the second pixel voltage VPn+1_m;

Step S825: judging whether the voltage difference Vdiff is greater or not less than the preset value Vpd; if the voltage difference Vdiff is greater or not less than the preset value Vpd, go to step S830; otherwise, go to step S880;

Step S830: setting the voltage of the data line DLm to be the reference voltage Vr during the interval after writing the first pixel voltage VPn_m into the first pixel Pn_m and before furnishing the second pixel voltage VPn+1_m to the second pixel Pn+1_m, wherein the data line DLm is electrically connected to the first pixel Pn_m and the second pixel Pn+1_m;

Step S880: retaining the voltage of the data line DLm to be around the first pixel voltage VPn_m during the interval after writing the first pixel voltage VPn_m into the first pixel Pn_m and before furnishing the second pixel voltage VPn+1_m to the second pixel Pn+1_m; and Step S890: furnishing the second pixel voltage VPn+1_m to the data line DLm and writing the second pixel voltage VPn+1_m into the second pixel Pn+1_m.

In the flow 800 of the first pixel voltage driving method described above, the preset value Vpd may be a voltage difference between the highest and lowest pixel voltages. Alternatively, the preset value Vpd may be a positive voltage less than the voltage difference between the highest and lowest pixel voltages, e.g. the preset value Vpd may be half the voltage difference between the highest and lowest pixel voltages. The reference voltage Vr may be a ground voltage or an intermediate voltage between the highest and lowest pixel voltages. In the embodiment shown in FIG. 7, the step S820 of calculating the voltage difference Vdiff between the first pixel voltage VPn_m and the second pixel voltage VPn+1_m is performed after the step S815 of writing the first pixel voltage VPn_m into the first pixel Pn_m. In another embodiment, the step S820 of calculating the voltage difference Vdiff between the first pixel voltage VPn_m and the second pixel voltage VPn+1_m is performed prior to the step S815 of writing the first pixel voltage VPn_m into the first pixel Pn_m.

Figure 8:
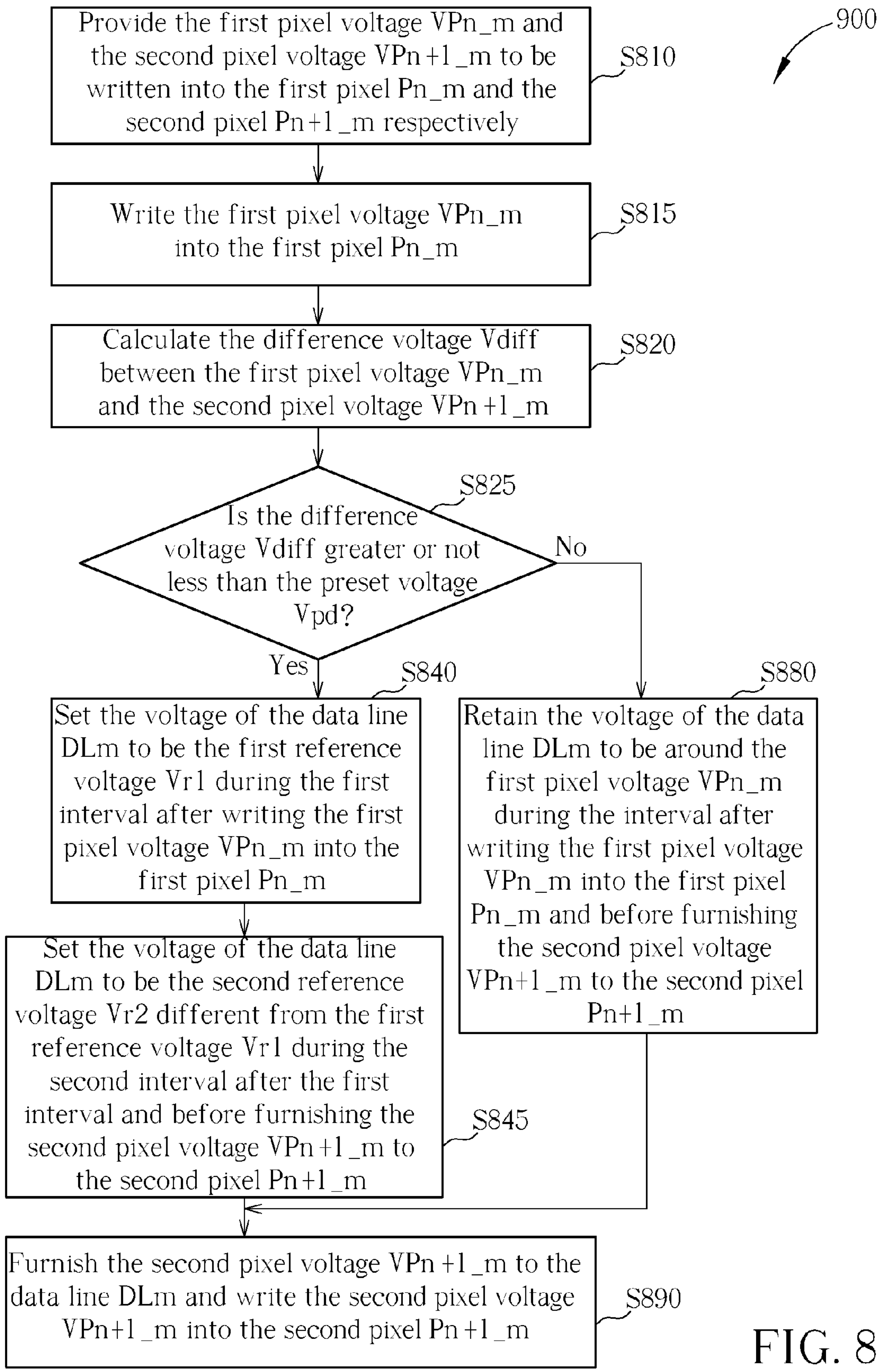
FIG. 8 is a flowchart depicting the second pixel voltage driving method for use in the display apparatus 100 illustrated in FIG. 1.

FIG. 8 is a flowchart depicting the second pixel voltage driving method for use in the display apparatus 100 illustrated in FIG. 1. As shown in FIG. 8, the flow 900 of the second pixel voltage driving method comprises the following steps:

Step S810: providing the first pixel voltage VPn_m and the second pixel voltage VPn+1_m to be written into the first pixel Pn_m and the second pixel Pn+1_m respectively, wherein the first pixel voltage VPn_m and the second pixel voltage VPn+1_m are employed to illustrate one and the same frame;

Step S815: writing the first pixel voltage VPn_m into the first pixel Pn_m;

Step S820: calculating the voltage difference Vdiff between the first pixel voltage VPn_m and the second pixel voltage VPn+1_m;

Step S825: judging whether the voltage difference Vdiff is greater or not less than the preset value Vpd; if the voltage difference Vdiff is greater or not less than the preset value Vpd, go to step S840; otherwise, go to step S880;

Step S840: setting the voltage of the data line DLm to be the first reference voltage Vr1 during the first interval after writing the first pixel voltage VPn_m into the first pixel Pn_m, wherein the data line DLm is electrically connected to the first pixel Pn_m and the second pixel Pn+1_m;

Step S845: setting the voltage of the data line DLm to be the second reference voltage Vr2 different from the first reference voltage Vr1 during the second interval after the first interval and before furnishing the second pixel voltage VPn+1_m to the second pixel Pn+1_m;

Step S880: retaining the voltage of the data line DLm to be around the first pixel voltage VPn_m during the interval after writing the first pixel voltage VPn_m into the first pixel Pn_m and before furnishing the second pixel voltage VPn+1_m to the second pixel Pn+1_m; and Step S890: furnishing the second pixel voltage VPn+1_m to the data line DLm and writing the second pixel voltage VPn+1_m into the second pixel Pn+1_m.

As shown in FIG. 8, the flow 900 of the second pixel voltage driving method is similar to the flow 800 of the first pixel voltage driving method shown in FIG. 7, differing in that the step S830 is replaced with the steps S840 and S845. The first reference voltage Vr1 and the second reference voltage Vr2 recited in steps S840 and S845 are two intermediate voltages between the highest and lowest pixel voltages.

Summarizing the above, the present invention provides a display apparatus having adaptation-mode data line voltage driving mechanism and pixel voltage driving method thereof for performing adaptive data line voltage setting operation during an intermediate period between pixel voltage writing intervals of two adjacent pixels so as to lower total data line voltage changing amount, thereby reducing data line driving power consumption.

The present invention is by no means limited to the embodiments as described above by referring to the accompanying drawings, which may be modified and altered in a variety of different ways without departing from the scope of the present invention. Thus, it should be understood by those skilled in the art that various modifications, combinations, sub-combinations and alternations might occur depending on design requirements and other factors insofar as they are within the scope of the appended claims or the equivalents thereof.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pixel voltage driving method adapted in a display apparatus having adjacent first and second pixels disposed in different rows, the pixel voltage driving method comprising:

providing a first pixel voltage and a second pixel voltage to be written into the first and second pixels respectively, wherein the first and second pixel voltages are employed to illustrate a same frame;

outputting the first pixel voltage to a data line electrically connected to the first and second pixels by a data driver for driving the first pixel during a first time interval;

when the first pixel voltage and the second pixel voltage having different polarities and a difference between the first pixel voltage and the second pixel voltage being greater than a preset value, the data driver outputting a reference voltage to the data line electrically connected to the first and second pixels during an intermediate time interval;

when the first pixel voltage and the second pixel voltage having same polarity and the difference between the first pixel voltage and the second pixel voltage being smaller than the preset value, the data driver retaining a voltage of the data line electrically connected to the first and second pixels to be substantially equal to the first pixel voltage during the intermediate time interval; and outputting a second pixel voltage to the data line electrically connected to the first and second pixels by the data driver for driving the second pixel during a second time interval following the intermediate time interval;

wherein the intermediate time interval is between the first time interval and the second time interval, and the preset value is a positive number.

2. The pixel voltage driving method of claim 1, wherein the reference voltage is a ground voltage.

3. The pixel voltage driving method of claim 1, wherein the reference voltage is an intermediate voltage between the first pixel voltage and the second pixel voltage.

4. A pixel voltage driving method for use in a display apparatus having adjacent first and second pixels disposed in different rows, the pixel voltage driving method comprising:

providing a first pixel voltage and a second pixel voltage to be written into the first and second pixels respectively, wherein the first and second pixel voltages are employed to illustrate a same frame;

calculating a voltage difference between the first and second pixel voltages, and comparing the voltage difference with a preset value for generating a comparison result;

determining if a data line electrically connected to the first and second pixels in the display apparatus is set to a reference voltage during an interval after writing the first pixel voltage into the first pixel and before furnishing the second pixel voltage into the second pixel according to the comparison result;

when the voltage difference is smaller than the preset value, retaining a voltage of a data line electrically connected to the first and second pixels in the display apparatus to be substantially equal to the first pixel voltage during an interval after writing the first pixel voltage into the first pixel and before furnishing the second pixel voltage to the second pixel; and when the voltage difference is greater than the preset value, setting the voltage of the data line electrically connected to the first and second pixels in the display apparatus to be the reference voltage during the interval after writing the first pixel voltage into the first pixel and before furnishing the second pixel voltage to the second pixel;

wherein when the first pixel voltage and the second pixel voltage are unequal, the reference voltage is between the first and second pixel voltages, and the preset value is a positive number.

* * * * *